(12) United States Patent
Matloubian et al.

(10) Patent No.: US 9,754,777 B1
(45) Date of Patent: Sep. 5, 2017

(54) LOW-FREQUENCY COMPACT AIR-CAVITY ELECTRODELESS HIGH INTENSITY DISCHARGE LAMPS

(71) Applicant: SPL Industries USA, Inc., Encino, CA (US)

(72) Inventors: Mehran Matloubian, Encino, CA (US); Timothy J. Brockett, Malibu, CA (US); Gregg A. Hollingsworth, Tempe, AZ (US)

(73) Assignee: SPL Industries USA, Inc., Encino, CA (US)

( * ) Notice: Subject to any disclaimer, the term of this patent is extended or adjusted under 35 U.S.C. 154(b) by 0 days.

(21) Appl. No.: 15/270,265

(22) Filed: Sep. 20, 2016

(51) Int. Cl.
| | |
|---|---|
| *H01J 1/50* | (2006.01) |
| *H01J 65/04* | (2006.01) |
| *H02J 50/12* | (2016.01) |
| *H05B 41/24* | (2006.01) |
| *H01J 61/30* | (2006.01) |

(52) U.S. Cl.
CPC .......... *H01J 65/042* (2013.01); *H01J 61/302* (2013.01); *H02J 50/12* (2016.02); *H05B 41/24* (2013.01)

(58) Field of Classification Search
CPC ......... H01J 65/042; H01J 61/302; H02J 50/12
USPC ......................................... 313/160, 607, 634
See application file for complete search history.

(56) References Cited

U.S. PATENT DOCUMENTS

| | | | | |
|---|---|---|---|---|
| 2009/0322240 | A1* | 12/2009 | Espiau .................. | H01J 65/042 315/248 |
| 2012/0242223 | A1* | 9/2012 | Espiau .................. | H01J 65/042 315/34 |

* cited by examiner

*Primary Examiner* — Vip Patel
(74) *Attorney, Agent, or Firm* — Richard T. Ogawa; Ogawa P.C.

(57) ABSTRACT

Electrodeless high intensity discharge lamps have the promise of higher reliability and higher efficiency than traditional electroded high intensity discharge lamps. However most electrodeless HIDs operate in the frequency range of around 400 MHz to 2.5 GHz resulting in expensive, inefficient RF drivers that reduce the overall efficacy of the lamp. Operating the lamp at lower frequencies results in substantial increase in the size of the resonators used in traditional electrodeless HIDs. In this invention a novel design is used to lower the operating frequency of the resonator without increasing the size of the resonator. This provides an avenue to increase the conversion efficiency of the RF driver and the efficacy of the lamp system.

22 Claims, 11 Drawing Sheets

LOW-FREQUENCY COMPACT AIR-CAVITY ELECTRODELESS HIGH INTENSITY DISCHARGE LAMPS

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to devices and methods for generating light with electrodeless high intensity discharge (HID) lamps. More particularly, the present invention provides high intensity discharge lamps driven by a radio-frequency source, operating at frequencies below 400 MHz, without the use of electrodes inside a gas-filled vessel (bulb) and related methods. Merely by way of example, such electrodeless HID lamps can be applied to applications such as parking lots, street lights, warehouses, stadiums, security, ports and harbors, large and small buildings, vehicle headlamps, billboard lighting, building facade lighting, airports, bridges, agriculture and horticulture lighting, architectural lighting, stage and entertainment lighting, medical illumination, microscopes, projectors and displays, ultraviolet (UV) water treatment, UV curing, any combination of these, and the like.

High intensity discharge lamps provide extremely bright and broad spectrum light source. Conventional electroded HID manufactured today contains a bulb with a mixture of gas and metal halides that are excited to form a plasma using a high current passed through closely-spaced electrodes. This arrangement, however, suffers from deterioration of the electrodes over time, and therefore a bulb with continual degradation of performance and limited lifetime.

Electrodeless high intensity discharge lamps driven by radio frequency (RF) sources have been proposed in the prior art. Some configurations include a metal halide fill encased either in a bulb or a sealed recess within a dielectric body forming a waveguide, with RF energy being provided by an external source such as a magnetron or solid-state RF driver and introduced into the waveguide and heating the plasma resistively. Another example is provided by U.S. Pat. No. 6,737,809 B2, which shows a different arrangement. This patent shows an electrodeless bulb and a dielectric cavity forming a part of a resonant RF circuit with an RF driver (which produces and amplifies electromagnetic energy at radio frequencies) to provide excitation. Several limitations, however, exist with this approach. The dielectric cavity is spatially positioned around a periphery of the electrodeless bulb in an integrated configuration, which physically blocks a substantial portion of the light emitted from the bulb. In addition, the integrated ceramic and quartz bulb configuration is difficult to manufacture and limits the operation and reliability of the plasma-enclosing bulb. Furthermore, the dielectric material used in this approach is often costly because of the difficultly in manufacturing and also due to the high-purity that is required to achieve competitive performance for most lighting applications.

In another approach disclosed in U.S. Pat. Nos. 8,283,866 and 8,294,368, an air-cavity resonator with grounded coupling elements is used to provide advantages over previous dielectric waveguide/resonator approaches. The air cavity resonator eliminates the need to use costly dielectric material and the bulb is not surrounded by a dielectric material resulting in more efficient operation of the lamp. However, this approach has its own limitations. These lamps are typically operated at frequency of around 435 MHz which is a limiting factor for the conversion efficiency of the RF driver (direct current (DC) to RF conversion efficiency of ~80%). If combined with the efficiency of the alternating current (AC) to DC power supply (which must be used when the lamp is connected to standard electrical sources provided by electrical utilities) the overall efficiency of the lamp's source (AC to RF conversion efficiency of <74%) can drop to levels less competitive against other existing lighting technologies.

To improve the overall system efficiency of the light source to levels that are more competitive against other existing technologies, the efficiency of the RF driver can be improved by operating at a much lower frequency than 400 MHz (for example, 100 MHz). By using an RF driver at a lower frequency, such as 100 MHz, it is possible to achieve RF driver conversion efficiency (DC-to-RF) exceeding 90% and overall conversion efficiency (AC-to-RF) of around 83% to 88%. This is a significant improvement over current approaches and will improve the overall system efficiency of the light source to exceed the efficiency of other existing technologies, such as traditional HIDs and become competitive versus LEDs. In addition, increasing the efficiency of the RF driver from 80% to 90% results in significant reduction of the dissipated power by the RF driver providing other benefits such as reducing the size and cost of the required heat sink and improving reliability. This solution, however, is complicated by the fact that prior embodiments of the RF waveguide/resonator or air-cavity resonator with grounded-coupling probes can only be operated at these lower frequencies with techniques that are prohibitively large in size and cost or results in significantly lower light output and efficacy.

From above, it is seen that techniques for improved electrodeless high intensity discharge lighting are highly desired.

BRIEF SUMMARY OF THE INVENTION

As mentioned above, previous embodiments of electrodeless HID lamps, such as described in U.S. Pat. Nos. 8,283,866 and 8,294,368, are based on a compact air cavity design with the dimensions of the cavity determining the operating frequency of the lamp system. These structures are heavily wavelength dependent, forcing operating frequencies above 400 MHz to satisfy mechanical size and performance specifications. Consequently, the maximum RF driver efficiency is limited to approximately 80%, limiting the overall system efficacy of the lamp. In addition, RF component costs become higher and provide less performance (efficiency and power) at higher frequencies. Both are detrimental to the performance of the overall lamp system in comparison to competing lighting technologies. Clearly, it is paramount to improve in performance of the overall lamp system by lowering the operating frequency to take advantage of RF drivers with both lower costs and better efficiencies.

In this invention, a novel compact air-cavity design is introduced that lowers the operating frequency of the lamp system to well below 400 MHz without substantially changing the dimensions of the air-cavity. When used in conjunction with the RF driver and lamp housing, it allows the lamp's operating frequency to be dependent on other parameters rather than solely the dimensions of the lamp housing. This allows one to set the operating frequency of the lamp system to a frequency where high efficiencies and lower costs can be achieved for the RF driver without needing to substantially enlarge the lamp housing.

In a specific embodiment, the lamp housing consists of a resonator body made from an electrically conductive material such as aluminum. The resonator body has an input coupling element and an output coupling element. The input coupling element is also made from an electrically conductive material. It is connected at one end, through an RF connector or pass-through hole in one end of the resonator body to an RF driver and at the other end is connected to the opposite end of the resonator body which is at ground potential. The output coupling element consists of the three sections. The top and bottom sections are made from electrically conductive materials with a middle section made from an electrical insulator or dielectric but with good thermal conductivity such as alumina. The output coupling element is connected at one end to the bottom of the resonator body and at the other end it passes through an opening at the top of the resonator body that forms an aperture region. The center conductor of an RF cable passing through a pass-thru or opening in the bottom of the resonator body is connected to the top section of the output coupling element. The other end of the center conductor of the RF cable is connected to outer conductor of the RF cable which is at ground potential. The length of the RF cable changes the resonant frequency of the resonator and by making it longer the resonant frequency can be lowered without substantially changing the dimensions of the resonator body.

A bulb or bulb-like vessel is attached inside a hole in the top section of output coupling element using high temperature epoxy or slurry. The majority of the bulb and the plasma arc inside the bulb are exposed and not covered by the output coupling element or the resonator body. The bulb is made from light-transmitted material like quartz or from a transparent/translucent ceramic with an inert gas such as argon or xenon and a combination of one or more metals and metal halides such as mercury, sodium, dysprosium, sulfur, indium bromide, scandium bromide, thallium iodide, holmium bromide, cesium iodide or other similar materials inside it. The bulb shape and fill are designed in such a way that when exposed to electromagnetic energy, its contents form a plasma state inside the envelope and produces high-intensity infrared, visible, and UV light.

The present invention achieves these benefits and others in the context of known process technology. However, a further understanding of the nature and advantages of the present invention may be realized by reference to the attached drawings.

BRIEF DESCRIPTION OF THE DRAWINGS

A more complete understanding of the present invention and its advantages will be gained from a consideration of the following description of preferred embodiments, read in conjunction with the accompanying drawings provided herein. In the figures and description, numerals indicate various features of the invention, and like numerals referring to like features throughout both the drawings and the description.

DETAILED DESCRIPTION OF THE INVENTION

Figure 1:
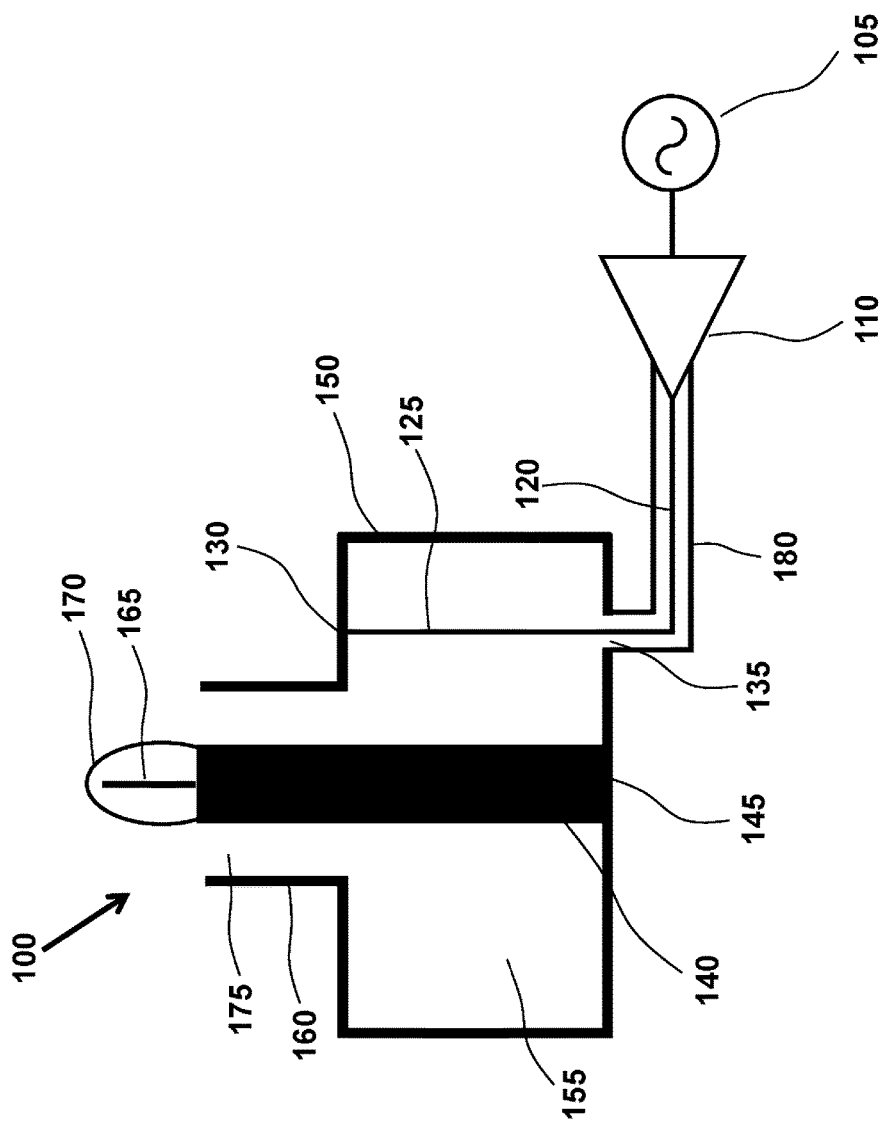
FIG. 1 is a drawing of a conventional compact air-cavity resonator electrodeless lamp.

The present invention is directed to devices and methods for generating light with electrodeless HID lamps. More particularly, the present invention provides high intensity discharge lamps driven by an RF source without the use of electrodes inside a bulb and related methods. Merely by way of example, such electrodeless HID lamps can be applied to applications such as parking lots, street lights, warehouses, stadiums, security, ports and harbors, large and small buildings, vehicle headlamps, billboard lighting, building facade lighting, airports, bridges, agriculture and horticulture lighting, architectural lighting, stage and entertainment lighting, medical illumination, microscopes, projectors and displays, UV water treatment, UV curing, any combination of these, and the like.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object. Additionally, the terms "first" and "second" or other like descriptors do not necessarily imply an order, but should be interpreted using ordinary meaning.

As mentioned previously, in previous embodiments of electrodeless high intensity discharge lamps a resonator/waveguide is used to couple the RF energy to the bulb. Using these techniques, size and performance requirements force the frequency of operation of the resonator/waveguide to be around 400 MHz or higher, and in consequence, limits the conversion efficiency of the RF driver and ultimately the efficacy of the lamp. In this invention, an innovative design is disclosed that allows the compact air-cavity resonator to operate at frequencies substantially below 400 MHz without significantly increasing the size of the resonator. As a result, the operating frequency of the electrodeless HID lamp becomes less dependent on the size and dimensions of the lamp module, providing the ability to maximize the efficiency of the RF driver and increase the overall efficacy of the lamp.

In a specific embodiment, the novel electrodeless high intensity discharge lamp consists of a compact air-cavity resonator. The resonator is made from a conductive material, such as aluminum, and can have any shape (circular, square, rectangular, cube, symmetrical, asymmetrical, etc.) with at least one aperture that allows a bulb assembly to protrude through. The opening is customarily designed to arrange the electromagnetic wave/fields in a manner that transfers energy into the bulb efficiently. The resonator has an input coupling element which consists of an electrically conductive wire connected at one end through a pass-through hole (or RF connector) in the resonator body to an RF driver consisting of an RF oscillator and a high power RF amplifier. The other end of the input coupling element is connected to the opposite end of the RF resonator pass-through which is at ground potential. The bulb assembly (output coupling element) consists of a combination of two electrically conductive sections made from a metal such as aluminum, and a non-electrically conductive section that is still thermally conductive such as a dielectric material or ceramic such as alumina. The non-conducting section separates the two electrically conductive sections from each other while allowing a thermal path for the heat generated by the bulb to be dissipated in the resonator body. The center conductor of an RF cable, passing through a second pass-through hole in the resonator body, is connected to a contact ring which makes electrical contact with the top section of the bulb assembly once the bulb assembly is screwed into the resonator. The other end of the center conductor of the RF cable is connected to the shield of the RF cable which is at ground potential. By increasing the length of this RF cable the total inductance of the resonant cavity increases which results in decreasing the resonant frequency of the air-cavity resonator. The length can be adjusted and then configured so that the dimensions of the lamp housing are not changed substantially.

The sealed bulb is made from quartz or from a transparent/translucent ceramic material. Inside the bulb there is an inert gas such as argon or xenon and a combination of one or more metals and metal halides such as mercury, sodium, dysprosium, sulfur, indium bromide, scandium bromide, thallium iodide, holmium bromide, cesium iodide, or other similar materials. The bulb is attached using a high temperature epoxy or slurry to top section of the bulb assembly such that the majority of the bulb is still exposed. One end of the bulb assembly attaches to the bottom plate of the air-cavity resonator using a mounting mechanism such as a bolt or screw while the other end of the bulb assembly with the bulb protrudes through the opening at the top of the air-cavity resonator. Using this approach, the bulb assembly in the air-cavity resonator is replaceable. The input coupling element transfers the RF energy from the RF driver to the output coupling element and results in a high electromagnetic field across the gap between the bulb assembly and lamp housing. The high electromagnetic field ionizes the gas inside the bulb which then melts and vaporizes the metal halides inside the bulb causing an intense emission of infrared, visible, and UV radiation from the bulb.

Typical dimensions of the air-cavity resonator would be around 50 mm to 100 mm in diameter (or width) and about 100 mm to 150 mm in height to achieve a resonant frequency of around 400 MHz. By choosing an RF cable with lengths from of 30 cm to 50 cm attached to the coupling ring the resonant frequency of the resonator can be lowered to around or below 100 MHz.

In another embodiment of this invention, the RF cable in the prior embodiment is replaced with an inductor. The inductor is connected at one end using a wire, passing through a feed-through in the resonator body, to the coupling ring and at the other end the inductor is connected to the ground potential. The top portion of the bulb assembly makes electrical contact with the contact ring once it is screwed into the bottom plate of the resonator body. As with the cable in the previous embodiment, the inductor increases the overall inductance of the resonant cavity, lowering the resonant frequency, without substantially changing the dimensions of the lamp housing.

In yet another embodiment of this invention, the inductor in the prior embodiment is integrated inside of the resonator cavity instead of through a feed-through or RF connector in the resonator body. The inductor is connected to the contact ring at one end and to the inside wall of the resonator body at the other end. The inductor serves to lower the resonant frequency of the air-cavity resonator without substantially changing the dimensions of the resonator body.

In another embodiment of this invention, the inductor in the prior embodiment is replaced with a variable inductor. By adjusting the value of this inductor the resonant frequency of the air-cavity resonator can be varied and tuned to the desired frequency of operation. The variable inductor will simplify the manufacturing process of the air-cavity resonator and lowers the tolerances needed for the dimensions of the resonator.

In yet another embodiment of this invention, the lumped inductor in prior embodiments is replaced with a circuit board with a printed or etched spiral inductor and is integrated inside the air-cavity resonator. One end of the spiral inductor is connected to the contact ring and the other end of the spiral inductor is connected to the inside wall of the air-cavity. This spiral inductor will also serve to lower the operating frequency of the air-cavity resonator without substantially changing its dimensions.

One or more benefits may be achieved using this novel compact air-cavity electrodeless HID lamp and related methods. As an example, the novel electrodeless HID is compact and efficient and can be integrated with fixtures with substantially smaller heat sinks compared to other electrodeless HIDs including the ones with dielectric resonator/waveguide and air-cavity resonators. These and other benefits may be achieved in one or more embodiments. Further details of the present invention can be found throughout the present specification and more particularly below.

Detailed Descriptions of the Embodiments are Presented:

FIG. 1 is a drawing of a conventional compact air-cavity resonator electrodeless lamp 100. The lamp consists of the lamp housing 150 made from an electrically conductive material such as aluminum and is primarily filled with air 155. An input coupling element 125 and an output coupling element 140 also made from electrically conductive material are separated by a gap. One end of the input coupling element is connected to an RF source consisting of an oscillator 105 and an amplifier 110 via an RF cable with a center conductor 120 and an outer jacket/shield 180 through a feed-through (or RF connector) 135 in the resonator body. The other end of the input coupling element is connected to the top of the lamp body 130 with the lamp body being at ground potential. One end of the output coupling element 140 is also connected to the lamp body 145 while the other end has a hole at the top to receive the bulb 170 which is attached to it using a high temperature epoxy or slurry. The plasma arc in the bulb 165 is substantially visible and it is not surrounded by the bulb assembly 140 or the lamp body 150. The bulb can be made from quartz or from a transparent/translucent dielectric or ceramic material. It is filled with an inert gas such as argon or xenon and a combination of one or more metals and metal halides such as mercury, sodium, dysprosium, sulfur, indium bromide, scandium bromide, thallium iodide, holmium bromide, cesium iodide, or other similar materials. The lamp body has a neck region 160 at the top of the resonator with air gap 175 separating the neck and the top of the output coupling element. The dimensions of the resonator including the capacitance of the neck region determine the operating frequency of the resonator (resonant frequency) and therefore the lamp. The input coupling element couples RF power from the RF source across the gap to the output coupling element. A high electric field is created between the output coupling element and the aperture region of the resonator housing. The high electric field ionizes the gas in the bulb which in turn vaporizes the metal halide material, resulting in intense light radiated by the bulb.

Figure 2:
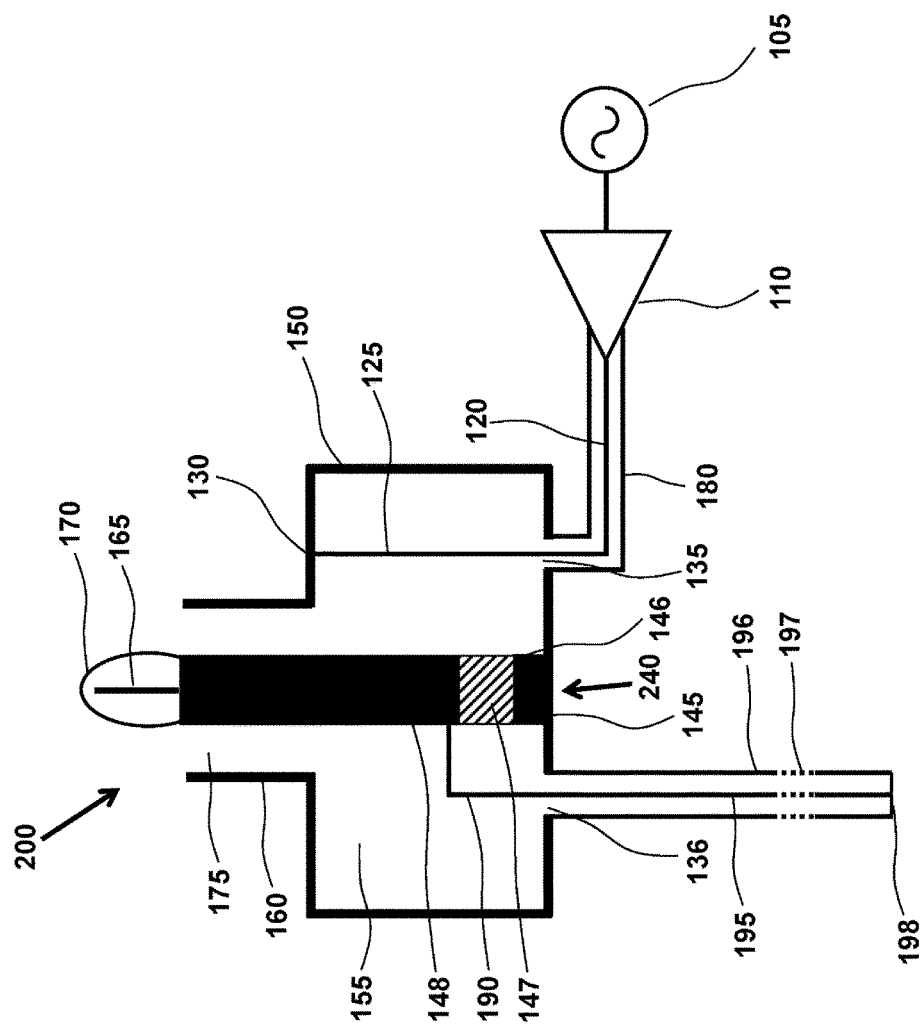
FIG. 2 is a drawing of one embodiment of this invention showing an air-cavity resonator electrodeless lamp with a distributed element in the form of an RF cable.

FIG. 2 is a drawing of one embodiment of this invention showing an air-cavity resonator electrodeless lamp 200 with a distributed element in the form of an RF cable. The lamp consists of the lamp housing 150 made from an electrically conductive material such as aluminum and is primarily filled with air 155. An input coupling element 125 and an output coupling element consisting of three sections 146, 147, and 148 with sections 146 and 148 made from an electrically conductive material and section 147 made from an insulator material such as ceramic. Section 147 electrically isolates the top section 148 of the output coupling element from the connection point of section 146 to the lamp housing 145 which is at ground potential. An RF cable with a center conductor 195 and outer jacket/shield 196 passes through a feed through (or RF connector) 136 into the lamp body with the center conductor of the cable connected via an electrically conductive wire 190 to the top section 148 of the output coupling element. At the other end of the RF cable 198, the center conductor 195 is connected to ground potential (or the jacket/shield) 196. The lamp housing also has a neck region 160 with an air gap 175 separating it from the output coupling element. For this air-cavity resonator the operating frequency of the resonator in addition to the dimensions of the lamp body, including the capacitance of the neck region 160, it also depends on the length 197 of the RF cable. By increasing the length of the RF cable the operating frequency of the resonator can be lowered without changing the other dimensions of the resonator body so one can operate the resonator at substantially lower frequencies without increasing the size of the resonator.

The input coupling element couples RF power from the RF source across the gap to the output coupling element. One end of the input coupling element is connected to an RF source consisting of an oscillator 105 and an amplifier 110 via an RF cable with a center conductor 120 and an outer jacket/shield 180 through a feed-through (or RF connector) 135 in the resonator body. The other end of the input coupling element is connected to the top of the lamp housing 130 with the lamp housing being at ground potential. One end of the top section of the output coupling element 148 is attached to the insulated section 147 while the other end has a hole at the top to receive the bulb 170 which is attached to it using a high temperature epoxy or slurry. The bulb in combination with the output coupling element forms the bulb assembly 240. The arc in the bulb 165 is substantially visible and it is not surrounded by the lamp housing. The bulb can be made from quartz or from a transparent/translucent dielectric material. It is filled with an inert gas such as argon or xenon and a combination of one or more metals and metal halides such as mercury, sodium, dysprosium, sulfur, indium bromide, scandium bromide, thallium iodide, holmium bromide, cesium iodide, or other similar materials. A high electric field is created between the output coupling element and the neck region of the resonator body. The high electric field ionizes the gas in the bulb which in turn vaporizes the metal halide resulting in intense light radiated by the bulb.

Figure 3:
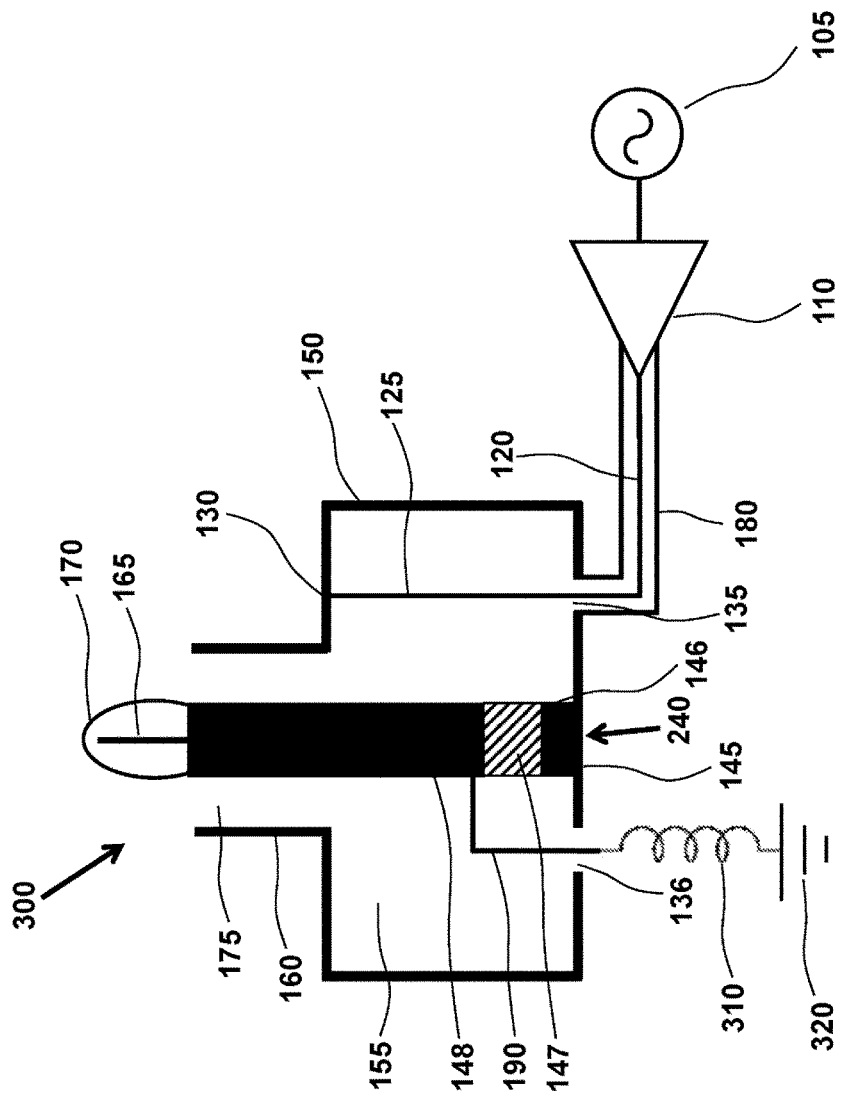
FIG. 3 is a drawing of another embodiment of this invention showing an air-cavity resonator electrodeless lamp similar to the one in FIG. 2 with the RF cable replaced with an inductor.

FIG. 3 is a drawing of another embodiment of this invention showing an air-cavity resonator electrodeless lamp 300 similar to the one in FIG. 2. In this embodiment the RF cable 195 in FIG. 2 is replaced with an inductor 310. The inductor is connected at one end to the top section 148 of the output coupling element through wire 190 and at the other end to ground potential 320. The resonant frequency of the lamp can now be lowered by increasing the value of the inductor without changing the other dimensions of the lamp housing.

Figure 4:
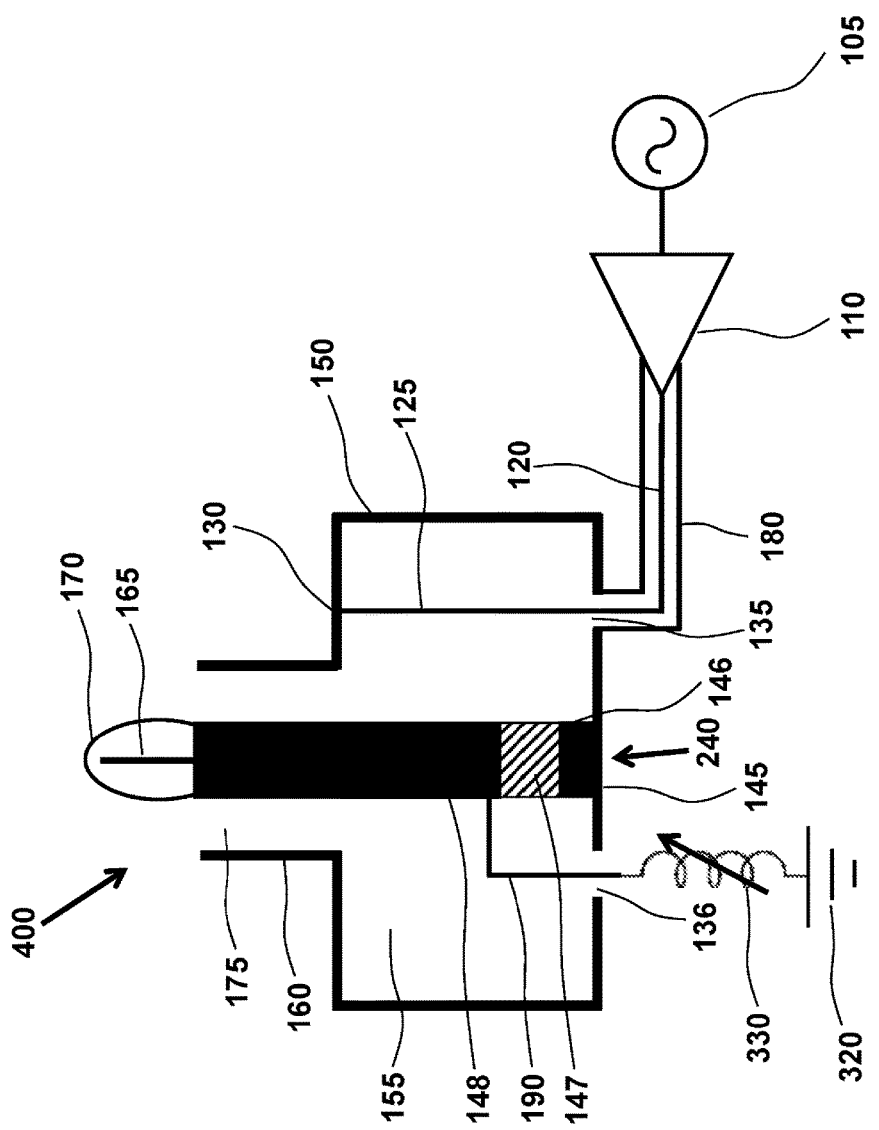
FIG. 4 is a drawing of another embodiment of this invention showing an air-cavity resonator electrodeless lamp similar to the one in FIG. 3 with the inductor replaced with a variable inductor.

FIG. 4 is a drawing of another embodiment of this invention showing an air-cavity resonator electrodeless lamp 400 similar to the one in FIG. 3. In this embodiment the fixed inductor 310 in FIG. 3 is replaced with a variable inductor 330. The resonant frequency of the lamp can be changed by tuning the variable inductor.

Figure 5A:
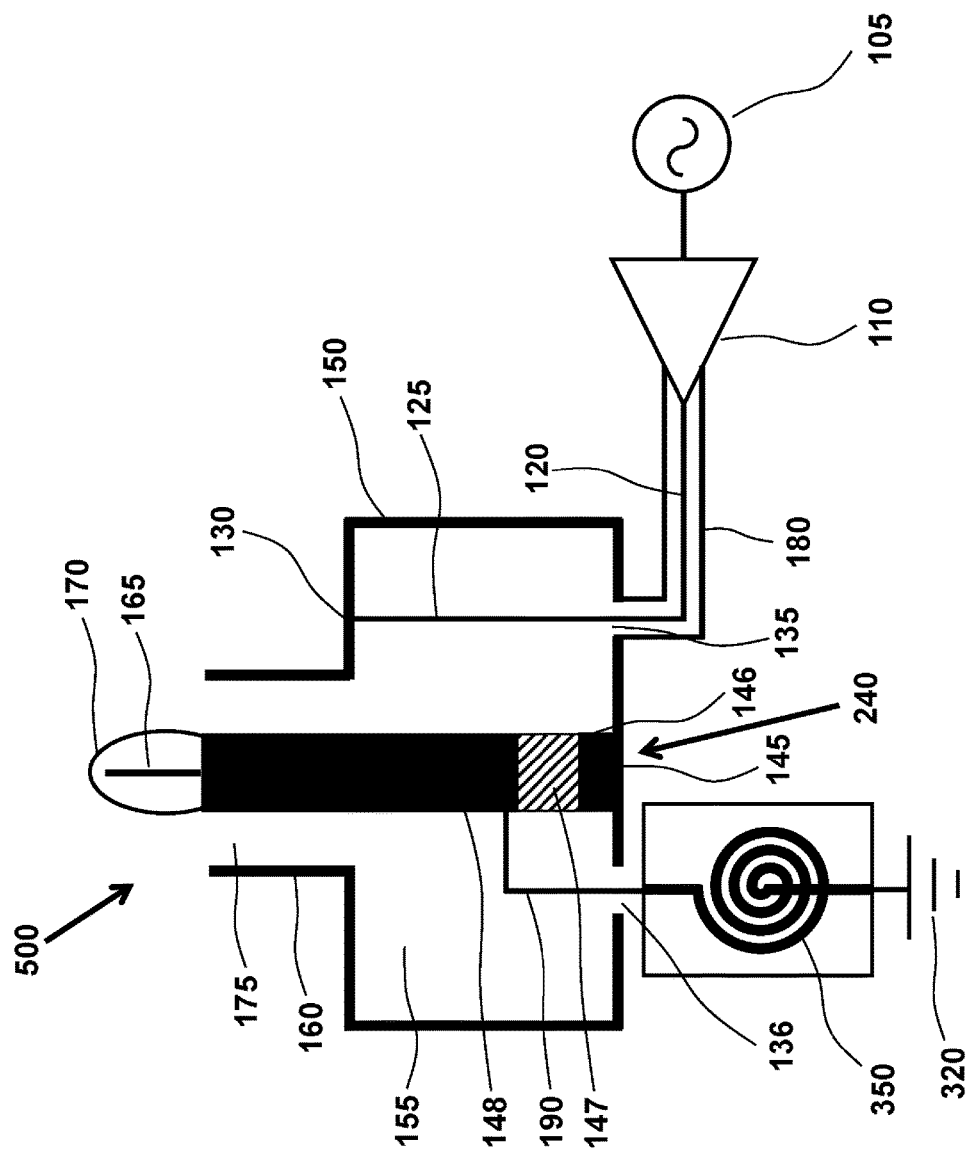
FIG. 5A is a drawing of another embodiment of this invention showing an air-cavity resonator electrodeless lamp similar to the one in FIG. 3 with the inductor replaced with printed circuit board with thin film spiral inductor.

FIG. 5A is a drawing of another embodiment of this invention showing an air-cavity resonator electrodeless lamp 500 similar to the one in FIG. 3. In this embodiment the inductor 310 in FIG. 3 is replaced with a printed circuit board with thin film spiral inductor 350. The thin film inductor is connected at one end to the top section 148 of the output coupling element using wire 190 and the other end to ground 320.

Figure 5B:
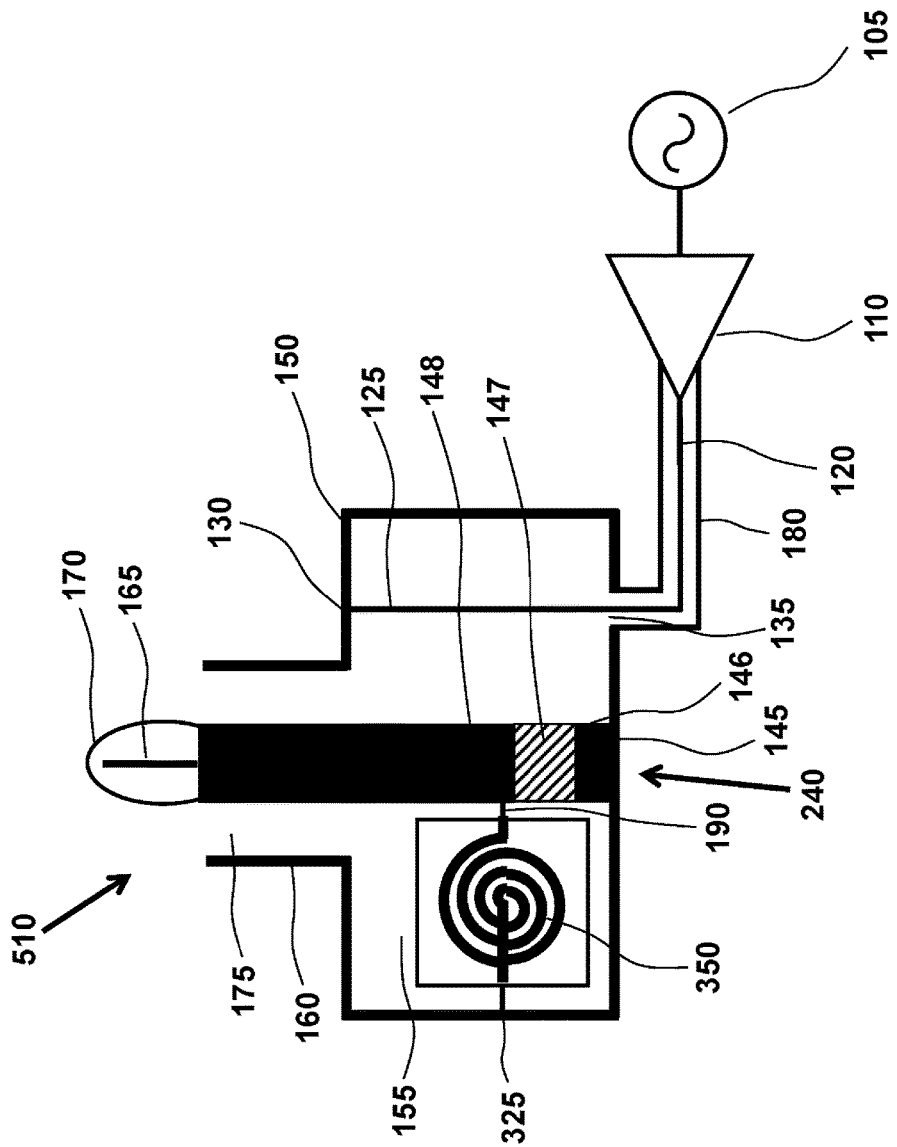
FIG. 5B is a drawing of another embodiment of this invention showing an air-cavity resonator electrodeless lamp similar to the one in FIG. 5A with the printed circuit board with thin film spiral inductor integrated inside the resonator cavity.

FIG. 5B is a drawing of another embodiment of this invention showing an air-cavity resonator electrodeless lamp 510 similar to the one in FIG. 5A. In this embodiment the printed circuit board with thin film spiral inductor 350 is integrated inside the resonator cavity/lamp housing 150. One end of the spiral inductor is connected to the top section 148 of the output coupling element using wire 190 and the other end is connected to the lamp body 325 which is at ground potential. In this embodiment the feed through 136 shown in FIG. 5A is eliminated.

Figure 6A:
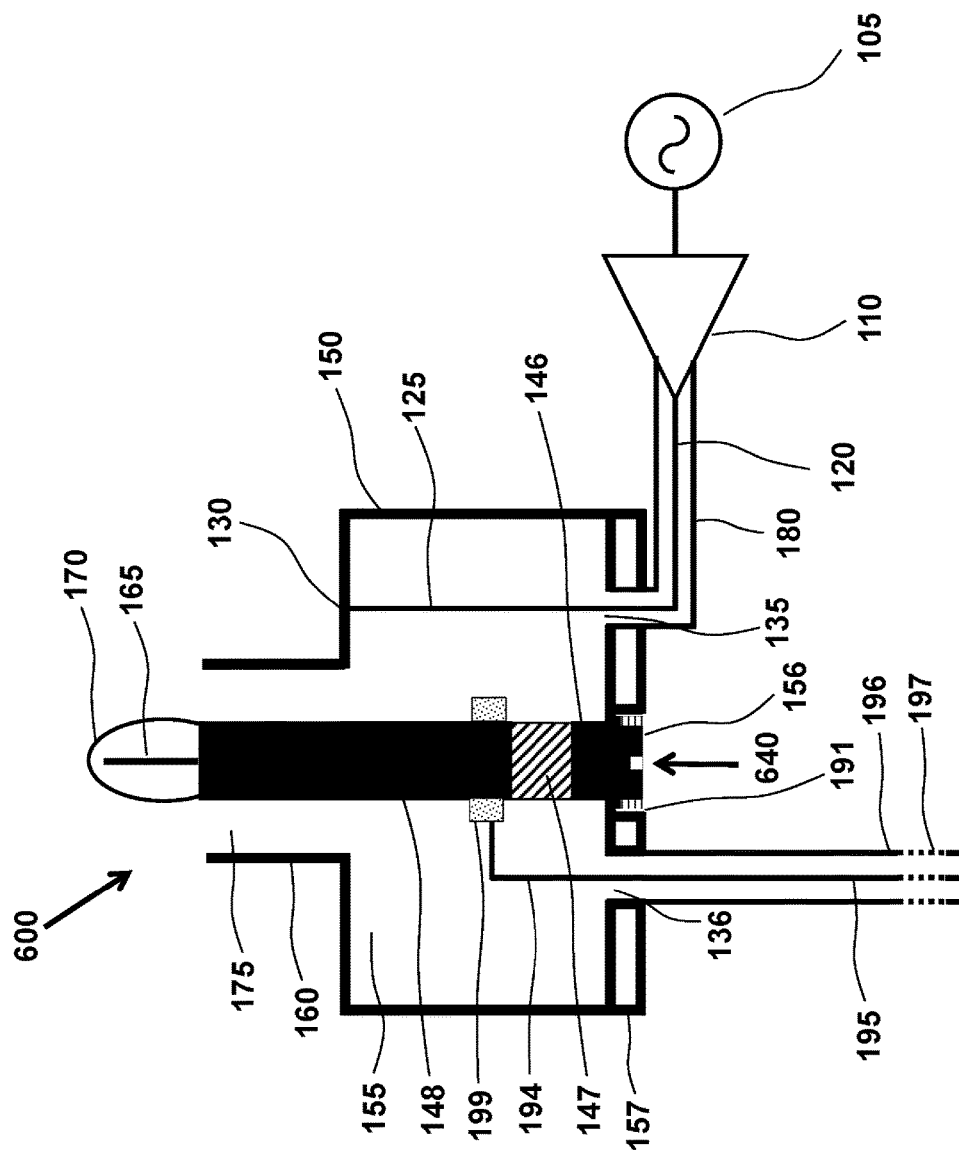
FIG. 6A is a drawing of another embodiment of this invention showing an air-cavity resonator electrodeless lamp similar to the one in FIG. 2 with the ability to replace the bulb assembly.

FIG. 6A is a drawing of another embodiment of this invention showing an air-cavity resonator electrodeless lamp 600 similar to the one in FIG. 2. In this embodiment the bulb assembly (output coupling element) 640 is screwed 156 into the lamp body's 150 back-plate 157. The bulb assembly is removable from the lamp body and can be replaced with another bulb assembly. This allows bulb replacement in a light fixture without having to change the lamp housing. The center conductor of the RF cable 195 is connected to the top section 148 of the bulb assembly through a wire 194 and a contact ring 199 which makes electrical contact with the top section of the bulb assembly once the bulb is screwed into the lamp body.

Figure 6B:
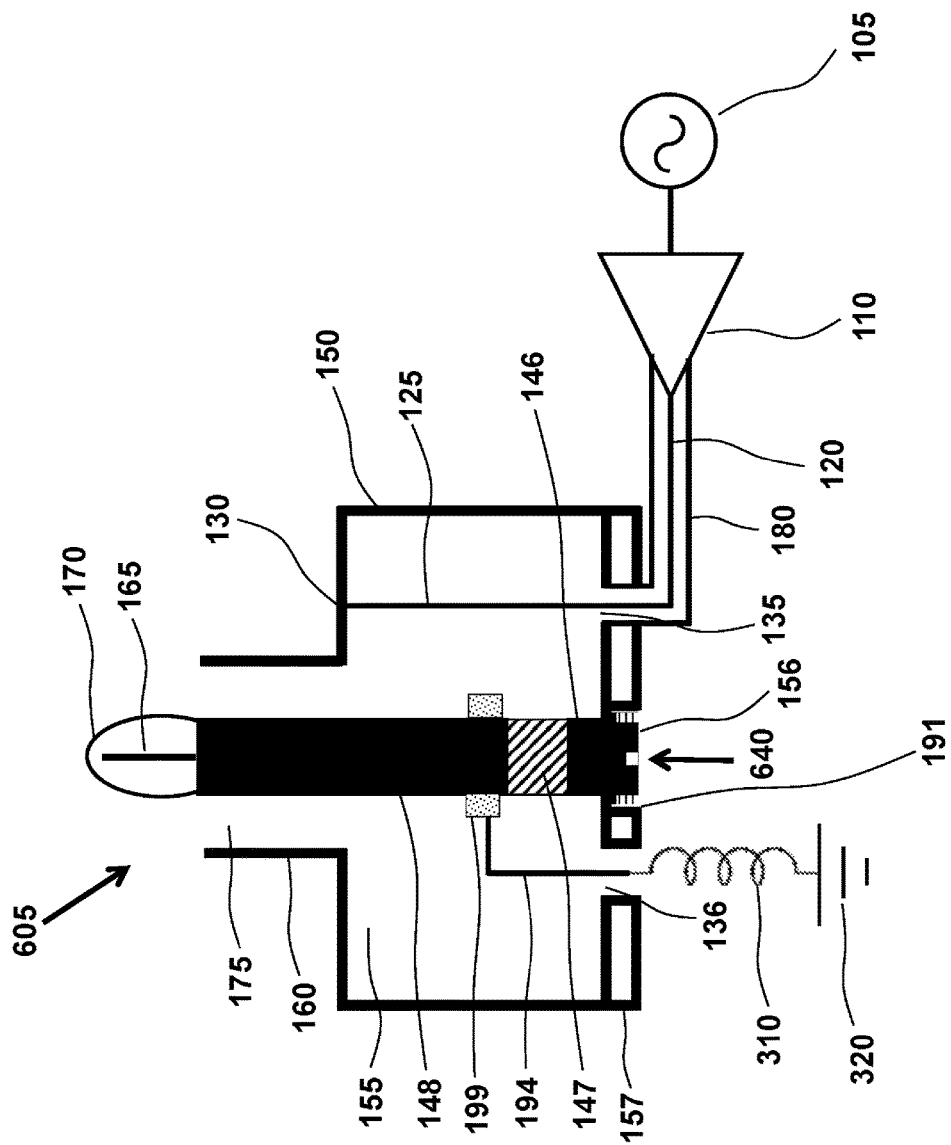
FIG. 6B is a drawing of another embodiment of this invention showing an air-cavity resonator electrodeless lamp similar to the one in FIG. 3 with the ability to replace the bulb assembly.

FIG. 6B is a drawing of another embodiment of this invention showing an air-cavity resonator electrodeless lamp 605 similar to the one in FIG. 3. In this embodiment the bulb assembly (output coupling element) 640 is screwed 156 into the lamp housing's 150 back-plate 157. The bulb assembly is removable from the lamp housing and can be replaced with another bulb assembly. This allows bulb replacement in a light fixture without having to change the lamp module. The inductor 310 is connected to the top section 148 of the bulb assembly through a wire 194 and a contact ring 199 which makes electrical contact with the top section of the bulb assembly once the bulb is screwed into the lamp housing.

Figure 6C:
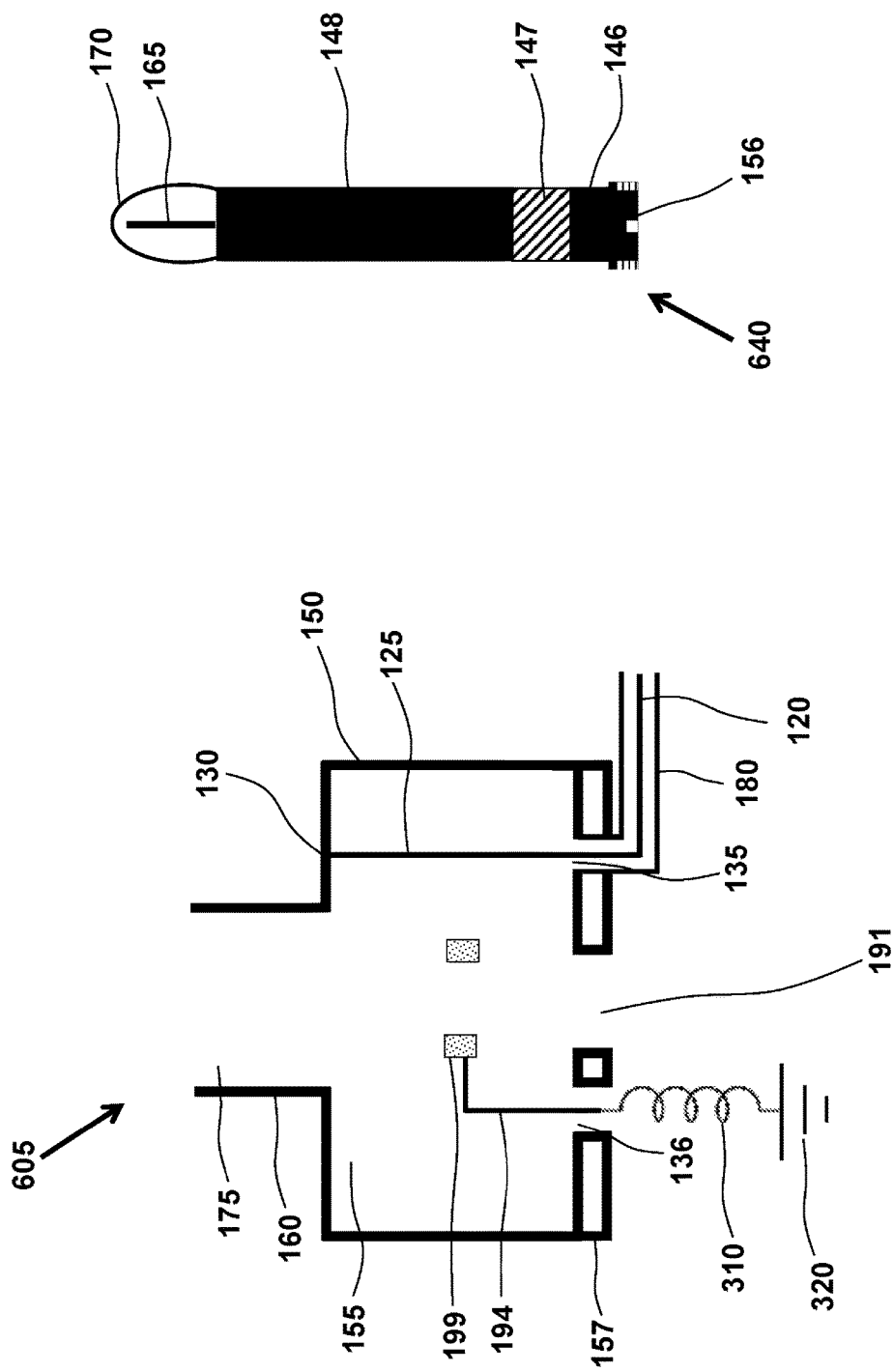
FIG. 6C is another drawing of the embodiment in FIG. 6B with the air-cavity resonator body and the bulb assembly shown separately.

FIG. 6C is another drawing of the embodiment in FIG. 6B with the air-cavity resonator body 150 and the bulb assembly 640 shown separately. The bulb assembly can be screwed into the resonator body 150 through the hole 191 in the back plate of the resonator body to complete the lamp module.

Figure 6D:
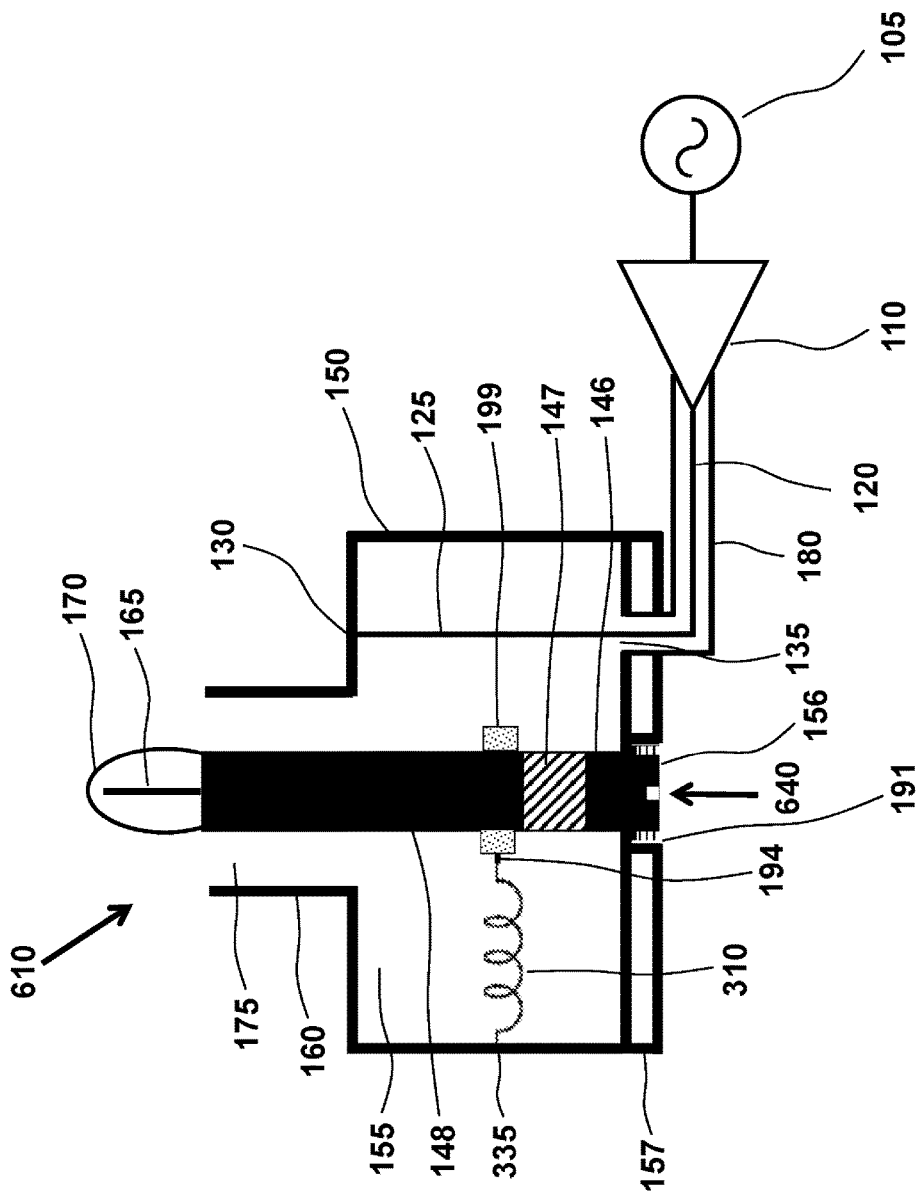
FIG. 6D is a drawing of another embodiment of this invention showing an air-cavity resonator electrodeless lamp similar to the one in FIG. 6B with the inductor integrated inside the resonator cavity.

FIG. 6D is a drawing of another embodiment of this invention showing an air-cavity resonator electrodeless lamp 610 similar to the one in FIG. 6B. In this embodiment the inductor 310 is integrated inside the resonator cavity/lamp housing 150. One end of the inductor is connected to the top section 148 of the output coupling element using wire 194 and contact ring 199. The other end of the inductor is connected to the lamp housing 335 which is at ground potential. In this embodiment the feed through 136 shown in FIG. 6B is eliminated.

Figure 7:
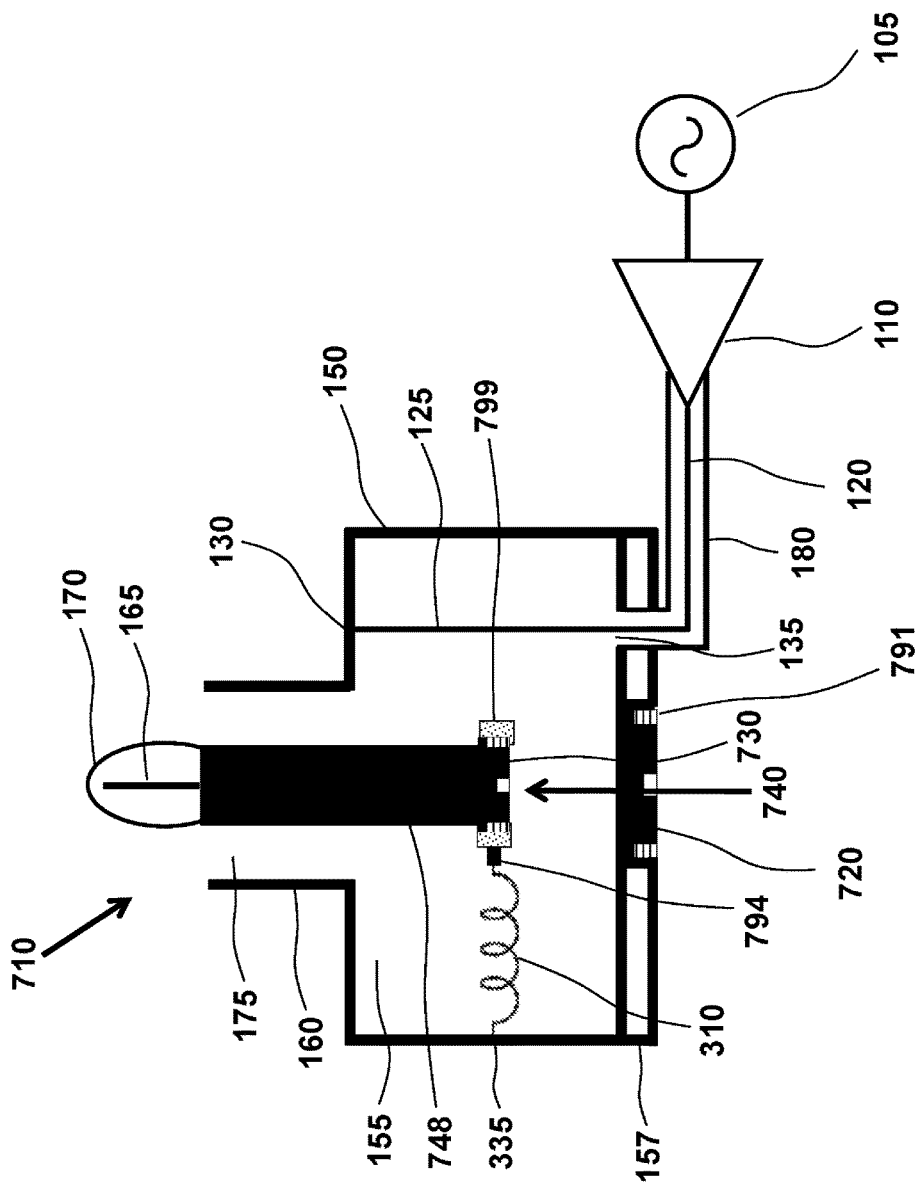
FIG. 7 is a drawing of another embodiment of this invention showing an air-cavity resonator electrodeless lamp similar to the one in FIG. 6D. However, in this embodiment the bulb assembly consists of only an electrically conductive section.

FIG. 7 is a drawing of another embodiment of this invention showing an air-cavity resonator electrodeless lamp 710 similar to the one in FIG. 6D. However, in this embodiment the bulb assembly 740 consists of only an electrically conductive section 748. The bulb 170 is attached to one end of the conductive section using high temperature epoxy or slurry and the other end of conductive section has a bolt or screw 730 that is used to attach the bulb assembly to the contact ring 799 which is made from an electrically conductive material such as aluminum. The contact ring is connected to inductor 310 through the wire 794. The other end of the inductor is connected to the lamp housing 335 which is at ground potential. There is a hole 791 in the back plate of the resonator body that can be used to access the bulb assembly if it becomes necessary to replace the bulb. The hole can be plugged during normal operation of the lamp using the screw-in plug 720.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An electrodeless high intensity discharge lamp comprising:
   an electrically conductive lamp module or housing having a spatial volume within the housing containing one or more apertures;
   a bulb assembly, comprising of one or more sections of conductive and non-conductive materials and a gas-filled vessel (bulb) that has a combination of gas and metal halides contained within, attached to, and contained within the lamp module or housing;
   an RF driver comprising of an RF source, amplifier, and supporting electronics;
   an input coupling element; and
   an output coupling element electrically isolated from the lamp housing, the lamp housing being at ground potential; and
   an insulating material providing the electrical isolation between the output coupling element and the lamp housing; and configured between the output coupling element and the lamp housing.

2. The lamp of claim 1 wherein the input coupling element has one end connected to the RF driver and its opposite end attached electrically to the lamp housing via a pass-through in the lamp module.

3. The lamp of claim 2 wherein the pass-through and attachment point of the input coupling element are separated by a certain distance that is based on effective operation of the lamp.

4. The lamp of claim 1 wherein the output coupling element has one end of a conductive section attached to the bulb, a section of non-conductive material comprising the insulating material, and a third section of conductive material that is attached to the lamp housing.

5. The lamp of claim 4 wherein the section attached to the bulb has an RF cable attached.

6. The lamp of claim 5 wherein the RF cable is situated external to the lamp module via a pass-through in the lamp module.

7. The lamp of claim 5 wherein the RF cable is a length in which lowers the resonant frequency below 400 MHz.

8. The lamp of claim 4 wherein the section attached to the bulb has an inductor attached.

9. The lamp of claim 8 wherein the inductor has one end attached to the ground potential.

10. The lamp of claim 8 wherein the inductor is characterized by an amount of inductance ranging from 0 Nano-Henry to 1 milli-Henry.

11. The lamp of claim 8 wherein the inductor has a value of inductance selected to cause an operating frequency to be less than 400 MHz and greater than 1 MHz.

12. The lamp of claim 8 wherein the inductor is replaced with a variable inductor.

13. The lamp of claim 8 wherein the inductor is replaced with a PCB that features a planar spiral inductor.

14. The lamp of claim 8 wherein the inductor is placed within the lamp module.

15. The lamp of claim 8 wherein the variable inductor is placed within the lamp module.

16. The lamp of claim 13 wherein the PCB is placed within the lamp module.

17. The lamp of claim 1 wherein the output coupling element is a contact ring that contacts the bulb assembly.

18. The lamp of claim 17 wherein the bulb assembly is removable from lamp module.

19. The lamp of claim 17 wherein the bulb assembly is in contact with the contact ring when installed inside the lamp module.

20. The lamp of claim 17 wherein the output coupling element is attached to one end of an inductor and the other end of the inductor is electrically grounded.

21. The lamp of claim 20 wherein the inductor is replaced with a variable inductor.

22. The lamp of claim 20 wherein the inductor is replaced with a PCB that features a spiral inductor.

* * * * *